B. F. REA.
ELASTIC TRACE-JOINT.

No. 175,164. Patented March 21, 1876.

WITNESSES:
E. Neveux
John Goethals

INVENTOR:
B. F. Rea
BY
[signature]
ATTORNEYS.

UNITED STATES PATENT OFFICE.

BENJAMIN FRANKLIN REA, OF LA FAYETTE, ALABAMA.

IMPROVEMENT IN ELASTIC TRACE-JOINTS.

Specification forming part of Letters Patent No. 175,164, dated March 21, 1876; application filed February 14, 1876.

*To all whom it may concern:*

Be it known that I, BENJAMIN F. REA, of La Fayette, Chambers county, Alabama, have invented a new and Improved Elastic Trace-Joint, of which the following is a specification:

My improved elastic trace-joint consists of a coiled spring fastened between two sections of the trace by attaching one end to each, and inside the coil are a couple of links, also connected to the trace-section, so that when the spring has been extended as far as is desirable, they come into action and take the strain off the spring, making, in effect, the ordinary inelastic trace, and taking the strain so as to protect the spring from being overstrained. The spring is connected to a ring at each end, and the links connect with the trace-sections by a screw passing through the ring and drawing the rings against the trace-sections by the links, making a simple, cheap, and efficient contrivance.

Figure 1:
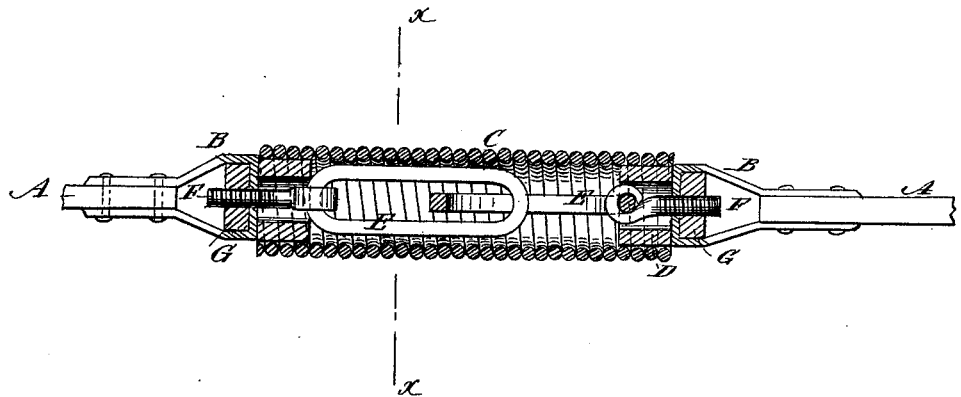
Figure 2:
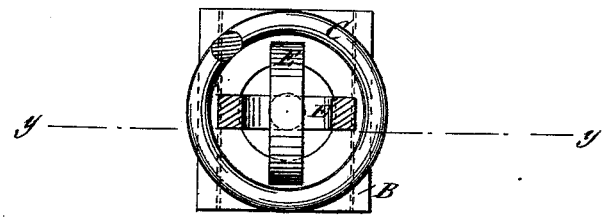

Figure 1 is a longitudinal sectional elevation of my improved elastic joint, taken on the line $y\,y$, Fig. 2; and Fig. 2 is a transverse section on line $x\,x$, Fig. 1.

Similar letters of reference indicate corresponding parts.

A represents the two sections of leather or other inelastic traces, each having a metal stirrup, B, to which the spring C is connected by a ring, D, link E, and screw F, the spring being attached to the ring. The screw passes through the ring and the bottom of the stirrup into nut G, and draws the end of the link E against the ring so as to hold the ring firmly against the stirrup.

The two links E have as much slack as it is intended that the spring shall extend, and they take the rest of the strain off the horse, no matter how much it may be, and thus make the required inelastic trace, after allowing the extension of the spring to ease the shocks. These elastic joints not only make the carriage easier for the rider, but afford great relief to the horse, and save considerably in wear upon the carriage.

Having thus described my invention, I claim as new and desire to secure by Letters Patent—

1. The combination of coiled spring C, and slack links E with the sections A of a harness tug or trace, substantially as specified.

2. The links E, screws F, rings D, stirrups B, and nuts $g$, combined with coiled spring $c$ and trace-sections A, substantially as specified.

BENJAMIN FRANKLIN REA.

Witnesses:
W. M. BRAGAM,
J. J. McLEMORE.